United States Patent
Derwin

[15] 3,704,497
[45] Dec. 5, 1972

[54] CUTTING TOOL
[72] Inventor: Louis A. Derwin, 4513 Cross Street, Downers Grove, Ill. 60515
[22] Filed: Nov. 9, 1970
[21] Appl. No.: 87,985

[52] U.S. Cl. .................................................. 29/96
[51] Int. Cl. ................................................ B26d 1/12
[58] Field of Search ..... 29/95, 96, 97, 98, 105, 105 A

[56] References Cited
UNITED STATES PATENTS

| | | | |
|---|---|---|---|
| 1,219,097 | 3/1917 | Gibbs | 29/96 |
| 1,415,379 | 5/1922 | Martin | 29/96 |
| 2,492,797 | 12/1949 | Gvetzkow | 29/105 A |
| 2,690,610 | 10/1954 | Begle | 29/105 A |

FOREIGN PATENTS OR APPLICATIONS

| | | | |
|---|---|---|---|
| 315,005 | 10/1919 | Germany | 29/95 |
| 1,100,241 | 1/1968 | Great Britain | 29/96 |
| 580,979 | 8/1959 | Canada | 29/105 |
| 829,946 | 3/1960 | Great Britain | 29/96 |
| 119,610 | 10/1918 | Great Britain | 29/96 |

*Primary Examiner*—Harrison L. Hinson
*Attorney*—John J. Kowalik

[57] ABSTRACT

A cutting bit and holder, wherein the holder is provided with a square edged groove and the tool is of square cross section and fits into the groove and therewith extends diagonally to the axis of the holder. A clamp which tightens against the holder has a right angle notch complimentally admitting an exposed corner of the tool and holding it tightly in the groove and torsionally preloads the tool.

9 Claims, 7 Drawing Figures

PATENTED DEC 5 1972

3,704,497

Inventor
Louis A. Derwin
By John J. Kowalik
Attorney 3,704,497

CUTTING TOOL

DISCUSSION OF THE PRIOR ART

Heretofore the mounting bars for the cutting tools have been formed with apertures through which the tools extended and a set screw held the tool. In order to improve the connection a type of mounting such as shown in U.S. Pat. No. 2,310,992 provided a V-shaped notch in the holder and a specially shaped triangular tool was positioned with one of its corners nested in the notch and the opposite side is engaged by a clamp bolted to the holder. This construction has the great disadvantage in being of different configuration then the standard square shank tool and thus requires a special holder which cannot be used with other tools. In addition the loads on the tool tends to wedge the tool out of the notch in the holder and these loads are transmitted to the threads of the holding bolt which requires a bolt of special construction and high quality steels and any loosenes tends to distort the threads.

Another disadvantage of the triangular tool bit is that it has only about one-half of the stock of a comparable square shank, and thus its cutting edge is reduced which accelerates wear. Furthermore, the thermal capacity of such triangular tool is reduced, it being well known that excess heat developing during the cutting operation of the tool has a deleterious effect upon its longevity and efficiency.

SUMMARY OF THE INVENTION

This invention is directed to a tool and holder therefor, wherein the tool shank is of quadrilateral cross section and is fitted into a complementary groove in the holder, the groove being defined by parallel sides and a bottom extending normal to the sides whereby the tool is held between the parallel sides, which resist torsional loads on the tool and prevent twisting and also adequately resist side thrusts on the tool and further provide extensive intimate areas of contact with the tool for effective heat transfer from the tool to the holder.

A principal object of the innovation is to provide a novel tool and holder assembly which is economical to manufacture, comprising a square groove which is simple to cut in the holder and admitting a complimentarily shaped standard tool shank.

A further object is to provide a novel tool and holder therefor, and a thrust clamp complimentarily engaging the tool square shank at a corner thereof opposed to the loading on the tool whereby the tool is securely held in place by minimal loading thereon.

A still further object in one embodiment of the invention is to provide a tool and holder assembly comprising a square shank tool which fits into a complementary groove and a clamp having a right angle notch admitting an exposed corner of the shank on a side opposite the working side of the tool, the clamp being accurately dimensioned and having an edge remote from the tool bearing against a flat land on the holder and being adjustably secured intermediate its ends by a bolt threaded into the holder, the remote end of the clamp abutting against a transversely disposed opposing surface on the holder.

The invention comprehends in another embodiment an arrangement wherein the clamp is integral with the tool holder and is adapted to be deflected into tight engagement with the tool by loading the bolt, securing the clamp between its ends to an opposing section of the holder whereby the work loads on the tool, and the thermal loads, are propagated directly into the body of the holder.

These and other objects and advantages inherent in and encompassed by the invention will become more apparent from the specifications and the drawings wherein.

DESCRIPTION OF THE EMBODIMENT OF FIGS. 1-5

Figure 1:
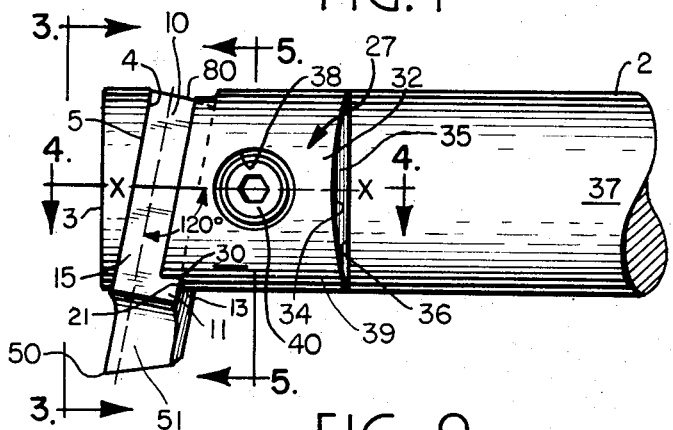
FIG. 1 is a fragmentary side elevation view of the one embodiment of my novel tool and holder assembly taken from one side of the tool.
Figure 3:
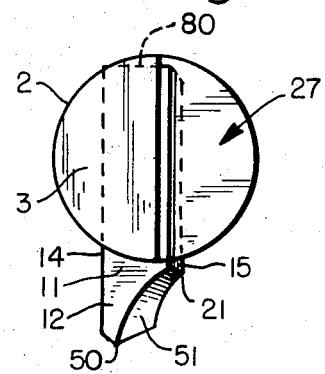
FIG. 3 is an end view of the tool and holder taken substantially on line 3—3 of FIG. 1.
Figure 2:
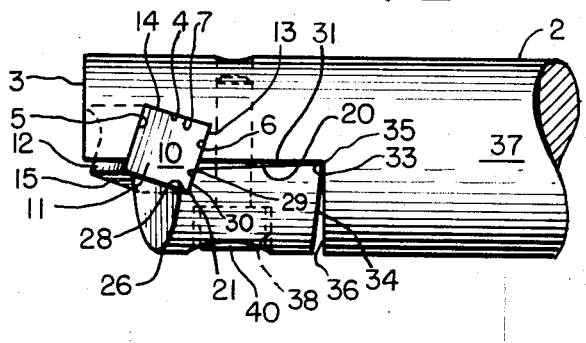
FIG. 2 is another side elevation of the structure of FIG. 1 taken from the rear end of the tool.

Referring now more particularly to FIGS. 1-5 of the drawings, the tool holder comprising a preferably cylindrical shaped support, bar 2, which may be supported in an arbor of a milling or boring machine, has an outer end portion 3 with a square side groove 4 which extends lengthwise transversely of the longitudinal axis of the support bar 3 diagonally thereto at an included angle of about 120° – 130° (FIG. 1). The groove or pocket 4 has a flat front face on side 5 and a flat rear face on side 6 parallel with face 5, said faces 5 and 6 defining the front and rear sides of the groove and extending perpendicular to the flat bottom side on face 7 of the groove. The side faces 5 and 6 are also angled widthwise approximately 15° to the axis X—X of the support bar 2.

A tool bit 10 has a square shank 11 with front and rear flat faces 12 and 13 respectively seated against faces 5 and 6 of the groove and has inner and outer flat faces 14 and 15. The inner face 12 seats against the bottom side of the groove.

A flat chordal land 20 is formed in one side of the bar 2 and intersects the groove 4.

Figure 4:
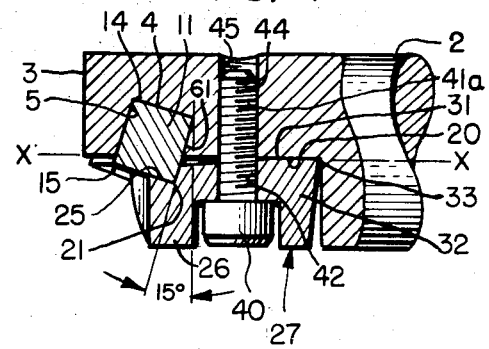
FIG. 4 is an axial sectional view thereof taken substantially on line 4—4 of FIG. 1.

From consideration of FIG. 4, it will be noted that the tool shank has its rear outer corner 21 extending out of the groove beyond the plane of the land 20 and that the outer face 15 of the shank converges with the land 20 toward the outer end of the bar and thus the bottom inner side of the groove and the inner face 12 of the tool shank converge with the axis X—X of the bar inwardly from the outer end thereof. This orientation exposes the outer rear corner 21 of the tool shank and orients the rear face 13 of the tool shank at an obtuse angle to the plane of the land 20.

The outer rear corner of the tool shank fits into a right angle notch 25 formed at the front of the inner section of the outer end portion 26 of a clamp 27, the notch having a flat face 28 complimentarily seated against the outer face 15 of the tool shank and has a transverse face 29 seated against the inner side 13 of the shank. Faces 28 and 29 merge into an apex 30. The clamp has an inner flat side 31 which converges inwardly of the holder with the land 20 and at the inner end 32 of the clamp forms a sharp corner 33 of less than 90° with an inner end face 34 on the clamp. This corner fits into a corner 35 formed between the land 20 and an intersecting right angled outer face 36 of the adjacent shoulder portion of the body 37 of the bar 2.

The clamp is provided with a recess 38 in its outer side 39 of larger diameter than the head 40 of a securing bolt 41 which has extending its shank 41a from the head 39 through an opening 42 communicating with the recess 38 and being threaded at 44 into a transverse threaded bore 45 in the bar 2, the bore 45 extending through the land 20.

In order to hold and lock the tool bit in place, the bolt 41 is threaded into the bore 45 and draws the clamp 27 toward the land 20, and the corner 33 is butted into the corner 35.

In addition to urging the tool shank into the groove, the tool is torsionally preloaded by imposing the clamping load at the inner rear corner of the shank which is diagonally opposite to the cutting point 50 which is formed at the inner front corner of the outwardly projecting portion 51 of the tool. Thus the torsion loads on the tool point are adequately counterbalanced and the torsional loading insures, in addition to the transverse loading on the tool shank, a tight fit of the tool shank in the groove to prevent the tool from shifting and also affords intimate head transfer contact between the tool bit and the holder.

EMBODIMENT OF FIGS. 6 AND 7

Figure 6:
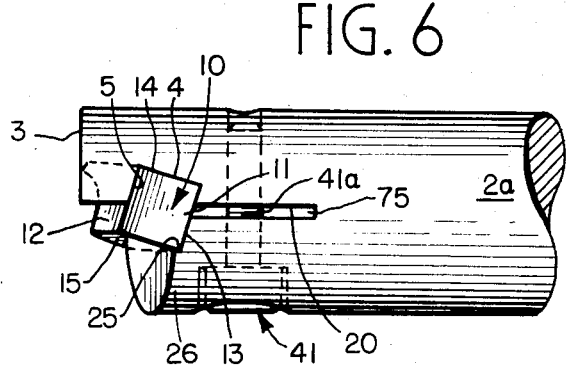
FIG. 6 is a side elevational view of another embodiment of a tool and holder in accordance with my invention taken from the rear end of the tool.
Figure 5:
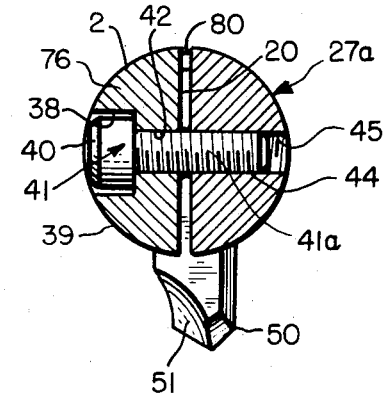
FIG. 5 is a cross-sectional view taken substantially on line 5—5 of FIG. 1
Figure 7:
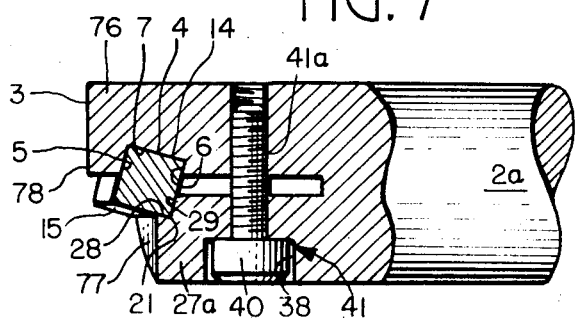
FIG. 7 is an axial sectional view similar to FIG. 4 of the assembly of FIG. 6.

The assembly shown in FIGS. 6 and 7 is similar to that of the previous embodiment and like parts will be identified with the same reference characters. In this embodiment the tool holder 2a has a saw slot 75 from its outer end 3 and then the clamp 27a is integral with the bar, but is shorter than the tool bit holder portion 76 of the bar 3. The outer end face 77 is offset inwardly from the end face 78 of the portion 76. The groove 4 and its orientation to the axis of the bar 2a is the same as in the previous embodiment. The shape of the clamp notch 25 and the position of the corner 21 are identical with the previous embodiment.

In the present structure, the clamp is a cantilever member and intermediate its ends is provided with the recess 38, and bolt 41 extends therethrough and has its shank 41 threaded into the bore 45. Since the cross-section of the clamp portion 27a is smaller than that of the portion 76, tightening of the bolt 41 deflects the clamp portion slightly and clamps the tool bit between the clamp 27a and the portion 76. The action of the clamp on the tool bit and its organization with the tool holder is the same as in the previous embodiment.

In order to adjust the tool in either embodiment the clamp is slightly loosened and the tool is tapped from its rear end 80 to proper position as required and then the clamp is tightened.

While in the foregoing disclosure there have been shown and described preferred embodiments of the invention, various modifications will be apparent to those skilled in the art. Accordingly, it is not intended to limit the invention to this disclosure and various modifications and equivalents may be resorted to falling within the spirit and the scope of the inventions herein claimed.

I claim:

1. A tool and holder assembly comprising a tool having a quadrilateral shank, a holder member having a groove of U-shape complimental to the shank and extending transversely of the holder adjacent to one end thereof, said tool fitted into said U-shaped groove and having inner, outer and bottom flat sides in engagement with corresponding sides of the groove, said groove having an inner side, outer side and a bottom side and said bottom side extending normal to said inner and outer sides, and said inner side of the groove being shallower than the outer side of the groove, said shank having a corner adjacent to said inner side of the groove projecting outwardly beyond said inner side of the groove, and means for torsionally preloading the tool clampingly engaging said shank only at said corner at one side of the longitudinal axis of the shank and impressing a turning moment on said shank about the longitudinal axis thereof and thereby forcing the shank into tight engagement with the sides of the groove.

2. The invention according to claim 1 and said means for torsionally preloading the tool comprising a clamp bearing at one end against the holder member and at the other end having a notch complemental to and pocketing said corner, and a tension bolt connecting said clamp to the holder.

3. The invention according to claim 1 and said means for preloading the tool comprising a clamp element integral at one end with said holder member and having a configuration at its other nd complemental to and embracing said corner, and adjustable means securing said clamp element intermediate its ends to said holder element and wedging the element into tight engagement with said corner of the tool.

4. The invention according to claim 1 and said holder member having a land extending lengthwise inwardly from said one end thereof and intersecting said groove, a shoulder on the member extending transversely of the land at an inner end thereof, said means for preloading said tool comprising a clamp having an inner edge face opposingly diverging from said shoulder and having an inner side forming a sharp corner with said face and extending into a corner formed between the land and shoulder, and said clamp having an outer end portion complementally embracing said corner of the tool shank, and a tension bolt extending through the clamp intermediate its ends and threaded into said holder member.

5. The invention according to claim 1 and said holder member comprising a cylindrical bar, and said groove extending longitudinally transversely of the bar, and having a flat bottom side and flat front and rear parallel sides extending normal to the bottom side and said tool shank being of square cross-section and having flat front, rear and bottom sides in complementary tight engagement with respective sides of the groove, said bar having a flat chordal land intersecting said groove, and said tool having an outer side parallel with said inner side thereof, and said outer side forming with said rear side said corner at the rear portion thereof, and said forward and outer sides of said shank forming a forward outer corner, said shank and groove being inclined with respect to said land whereby said rear outer corner projects outwardly farther than said forward outer corner, said outer side of the tool converging with the plane of said land toward the outer end of the tool, and said means for preloading the tool comprising a clamp associated with the bar and confronting said land, and having an outer end portion with a notch complemental to said rear outer corner of the shank and admitting the same therein, and a cutting point formed on the shank contiguous to a corner thereof diagonally opposite to said outer rear corner.

6. The invention according to claim 6 and said clamp being integral with said bar and extending alongside said land.

7. The invention according to claim 6 and said clamp being a separate element fulcrumed at its other end on said land and reacting at its said one end against the outer rear corner of said tool shank.

8. The invention according to claim 6 and said groove having its longitudinal axis projecting beyond the outer end of the bar and said clamp having rocking engagement with said bar along a surface on the bar extending transversely thereof.

9. The invention according to claim 1 and said tool shank having a corner diagonally disposed with respect to said outer rear corner, and a cutting point formed on the shank contiguous to said corner.

* * * * *